A. L. HANSEN.
MINER'S ACETYLENE LAMP.
APPLICATION FILED JULY 26, 1915.
1,202,514.
Patented Oct. 24, 1916.
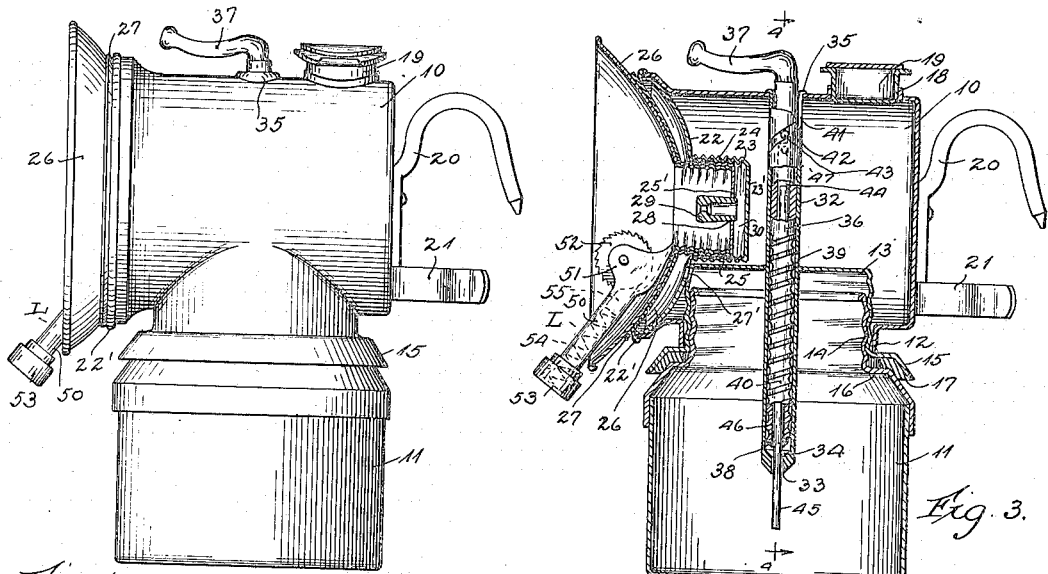
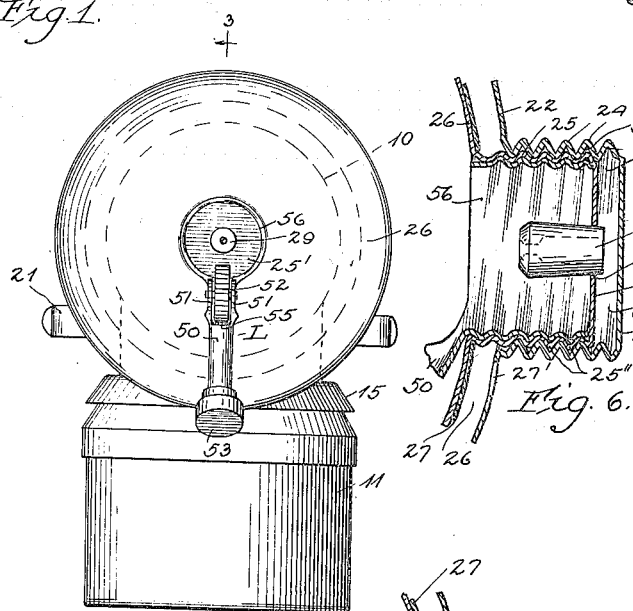
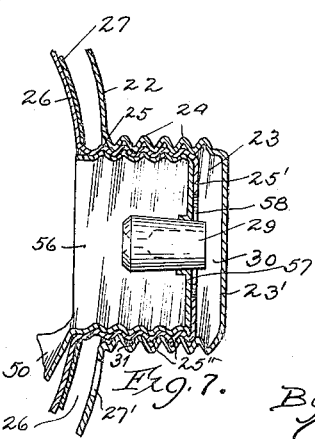
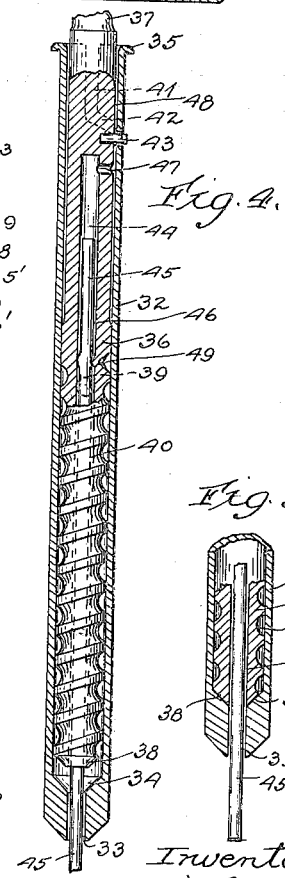
Witnesses,
S. M. Ryan
C. J. Schmidt
Inventor,
Augie L. Hansen
By James R. Offield
Atty.

UNITED STATES PATENT OFFICE.

AUGIE L. HANSEN, OF EVANSTON, ILLINOIS, ASSIGNOR TO JUSTRITE MANUFACTURING COMPANY, OF CHICAGO, ILLINOIS, A CORPORATION OF ILLINOIS.

MINER'S ACETYLENE-LAMP.

1,202,514.  Specification of Letters Patent.  Patented Oct. 24, 1916.

Application filed July 26, 1915. Serial No. 41,889.

*To all whom it may concern:*

Be it known that I, AUGIE L. HANSEN, a citizen of the United States, and a resident of Evanston, in the county of Cook and State of Illinois, have invented certain new and useful Improvements in Miners' Acetylene-Lamps, of which the following is a specification.

My invention relates to miners' acetylene lamps and particularly that class in which a valve is employed to control the flow of water through a tube from a water container to a carbid container.

In lamps of this class the water tube has usually a valve seat therein and a valve stem extending through the tube has a surface for engaging the seat, and the arrangement for adjusting the valve stem with reference to the seat is by threading corresponding sections of the tube and stem in order that the stem may be raised or lowered by rotation thereof. There are many disadvantages associated with such threading. One disadvantage is that quick adjustment of the valve outlet cannot be made as the stem must be rotated a considerable distance on account of the low pitch of the threads. Another disadvantage is that the stem must be rotated a great number of times before it can be withdrawn from the tube. A further disadvantage is that the threads wear and it is sometimes difficult to get them started properly one into the other.

One important object of my invention is therefore to dispense with such threading arrangement and to provide instead pin and slot connection between the water tube and valve stem, the tube being provided with a vertical slot section terminating in a diagonal or spiral slot section and the stem having a pin for extending into the slot sections. The diagonal slot section is given sufficient pitch so that quick adjustment can be made of the water valve outlet by only a fractional turn of the stem, and on account of the vertical slot section the stem can be readily withdrawn from the water tube after only a fractional turn of the stem. The valve stem can thus be quickly and accurately adjusted and can be quickly withdrawn for cleaning purposes.

Another object of the invention is to provide improved arrangement and control for insuring a steadier and more uniform flame, particularly when the lamp is being jarred and shaken as when used by miners. Part of such control is effected by causing the water to flow through a circuitous or tortuous passageway between the water container and the carbid container so that the inertia of flow will prevent erratic and irregular feed of water to the carbid to thus prevent sudden variations and fluctuations in the generation of gas and pressure. Another part of the flame control is effected by causing the generated gas to flow through a prolonged passageway in order that the inertia of flow will prevent flickering of the flame.

Another object of the invention is to provide improved means for cleaning the gas before it reaches the burner tip and for this purpose one or more traps are interposed in the prolonged gas passageway for catching any carbid particles or dirt which may be carried with the gas from the carbid chamber.

It may happen that the burner tip becomes clogged or closed immediately after a heavy charge of water to the carbid container followed by closure of the valve. Another object of the invention is to insure safety by preventing explosions under such conditions. I prevent such explosion by providing a capillary passageway between the carbid container and the exterior of the lamp which passageway, under normal conditions is filled with water and sealed but which, under extraordinary and excessive pressure, is cleared of water by such pressure and excess gas allowed to escape therefrom.

Another object is to provide improved means for applying a pyrophoric igniter to the lamp.

The above and other features of the invention will be more clearly understood by reference to the accompanying drawing, in which—

Figure 1 is a side elevational view of a miner's lamp, Fig. 2 is a front elevational view, Fig. 3 is a sectional view on plane 3—3, Fig. 2, Fig. 4 is an enlarged sectional view on plane 4—4, Fig. 3, Fig. 5 shows the lower section of Fig. 4 but with the valve in closed position, Fig. 6 is an enlarged vertical diametral sectional view showing the seating and supporting arrangement of the reflector and pyrophoric igniter and illustrating particularly the prolonged gas passageway, and Fig. 7 is a sectional view similar to Fig. 6 but showing a modified arrangement.

The lamp shown has a cylindrical water container 10 of sheet metal arranged with its axis horizontal, and a cylindrical carbid container 11 arranged with its axis vertical. Inserted through the opening 12 in the base of the water container is the inverted cup-shaped sheet metal part 13 which is threaded to form a socket for the threaded neck 14 of the carbid container. Between the flange 15 surrounding the lower edge of the cup part 13 and the shoulder 16 of the carbid container is interposed the sealing washer 17 which may be of rubber. The top of the water container has the flanged water charging opening 18 for which a closure 19 in the form of a plug is provided. In the back of the container is secured a hook 20 and a clamp 21 for suspending the lamp from a miner's cap. The front of the water container is closed by a concave wall 22 whose central section is deflected inwardly to form the cylindrical socket 23. The cylindric sides of this socket have the threads 24 for receiving the threaded cylindrical section 25 formed by deflecting the central section of a concave reflector 26. The edge section 22' of the front wall 22 of the water container extends a distance outwardly to space the reflector away from the wall 22 when the threaded part 25 is screwed into the socket 23 to bring the reflector against the edge section 22' in order to leave the annular chamber 26 between the reflector and the wall 22. To seal the engagement of the reflector with the wall a gasket 27 is preferably inserted. The wall 22 abuts against the side of the carbid container receiving socket 13 and through these abutting walls a gas outlet opening 27' is provided through which the gas can flow from the carbid container into chamber 26. Referring to Figs. 3 and 6, the inner wall 25' of the cylindrical part 25 of the reflector structure has the opening 28 in which a burner tip 29 is seated and the length of the part 25 is such that when it is screwed into the socket 23 it will leave a chamber 30 between wall 25' and the rear wall 23' of socket 23. In order that gas may flow from the chamber 26 to chamber 30 and through the burner tip the threads 25'' on the part 25 are flatter than the threads 24 of socket 23 or the threads are otherwise relatively formed to leave the spiral passageway 31 between them through which the gas may flow.

Extending downwardly through the water container and axially into the carbid container is a cylindrical water tube 32 having the outlet passageway 33 in its lower end and surrounding the upper end of which is the conical valve seat 34. The upper end 35 of the tube is curled over against the top of the water container and at its middle the tube is secured to the top wall of the frame 13 as by soldering, the tube being thus securely anchored. Extending through the tube is a valve stem 36 whose outer end has the handle 37 and whose lower end is shaped to form the conical valve surface 38 for cooperating with the valve seat 34 to control the flow of water to passageway 33. In the tube directly above the top wall of socket frame 13 is the water inlet opening 39 through which water may flow into the tube from the water container. In order to allow flow of water through the tube the valve stem may be of less diameter than the tube but preferably the water is forced to take a circuitous route before reaching the carbid container. As shown, the valve stem is of the same diameter as the tube and has a helical groove 40 cut therein which with the tube sides forms a long helical passageway from the inlet opening 39 to the outlet opening 33. This long passageway offers resistance and retardation to the flow of water which prevents the escape of gas therethrough under ordinary pressure in the carbid container. If the gas pressure becomes so great that it cannot be relieved through the burner tip the resistance in the long passageway will be overcome and the water will be forced back into the water container and excess gas will escape into the water container.

One of the important features of my invention is the simple and efficient arrangement for adjusting the valve stem to control the volume of water flow to the carbid container. The water tube has the vertical slot section 41 leading down from the upper edge of the tube and connecting with the diagonally or spirally extending slot section 42 cut in the tube a short distance above the water container. Extending into the slot section 42 from the valve stem is a pin 43 which coöperates with this slot section to raise or lower the valve stem as the stem is turned by manipulation of its handle 37. The pitch and length of the slot section 42 is such that the fraction of a turn of the stem will suffice to either shift the stem to close the outlet 33 or to open this outlet wide. In Figs. 3 and 4 the pin is mid-way between the ends of the diagonal slot section and the valve stem is raised a distance above the seat 34 to expose the outlet 33 for the flow of water therethrough. When the stem is turned in one direction the pin reaches the corresponding end of the slot section 33 when the valve is closed and the abutment of the pin with the slot end prevents further turning of the valve stem and thus protects the valve and seat against over-pressure. When the stem is turned in the opposite direction the pin travels to the top of the diagonal slot section and to the base of the vertical slot section 41 to fully open the valve; and then, if desired, the stem can be readily withdrawn from the tube, the pin during such withdrawal traveling through the vertical slot section 41. Any accumulations of dirt or carbid particles or dust in the helical groove 40 and in the tube can very readily be cleaned, and then the stem can be readily reinserted to carry the pin back to the diagonal valve adjusting slot section. The pin and slot connection between the valve stem and tube is a decided improvement over the ordinary threading arrangement between these parts as adjustment of the valve can be more quickly and readily made, and furthermore only a fractional turn of the stem will suffice to permit withdrawal of the stem from the tube. Where a threading connection is used a stem would have to be turned a number of times before it could be withdrawn.

I have already pointed out that when the valve is open and the gas pressure becomes excessive the water column will be forced back into the water container through inlet 39 to permit escape of excess gas into the container. This excess gas can escape to the exterior of the lamp through slot 41. The lamp is thus protected against explosion when the pressure becomes excessive when the valve is open and the excess pressure cannot relieve itself through the tip. Excess pressure is also liable to occur when the tip becomes clogged or closed after a heavy charge of water to the carbid container followed by closure of the valve. I also provide relief means to prevent explosion under such conditions. As shown, the valve stem has the bore 44 through which extends a wire or rod 45 whose diameter is slightly less than that of the bore in order to leave a capillary passageway 46. At the upper end of the bore the stem has the outlet opening 47 to the water tube, and to afford connection from the outlet 47 to the exterior of the lamp the upper end of the stem is sufficiently loose in the tube to leave a clearance space 48. The rod 45 may be held in place in the valve stem in any desired manner. As shown, the stem is indented at 49 to kink the rod and thus hold it in place. The operation of the relief arrangement is as follows: When the water valve is open as shown in Figs. 3 and 4, and water is flowing through the tube capillary attraction will cause water to flow upwardly in the space 46 to seek the level of the water in the water container and this film of water, on account of the resistance, forms a seal against the escape of gas under ordinary conditions. When the valve stem is down the outlet 33 is disconnected from the helical water passageway but remains in connection with the space 46 (Fig. 5). On account of capillary attraction a film of water remains in the space 46 after closing of the valve and maintains the seal. Now, should the tip become clogged or closed there is no escape for the gas except through the space 46. But the water seal will hold until the pressure becomes abnormal and excessive and then it will yield and the water will be forced upwardly through the space and into the water container by way of passageway 47, clearance space 48 and the slot 42, the excess gas following the water and passing to the exterior of the lamp through slot section 41. The lamp can thus be operated with absolute safety, there being no danger of explosion. When the water valve is again open the sealing film will again form.

On account of the inertia of the long water stream through the spiral passageway the gas pressure is kept from fluctuating and the result is a steadier and more uniform flame. As before described, the gas must first pass through the long spiral passageway 31 between the threads of the reflector structure and the socket 23 before it can reach the burner tip. Such long flow of gas also tends to prevent gas fluctuation and assists in keeping the flame uniform and steady. The chambers 26 and 30 interposed in the gas flow serve as traps for any particles of carbid, dust or dirt which may accompany the gas from the carbid container and the gas is thus thoroughly cleaned before it is burned. The chambers can be readily cleaned of the dust and dirt particles by unscrewing the reflector structure and the tip can be readily cleaned by blowing therethrough or by means of a wire.

I also show simple and improved arrangement for applying a pyrophoric lighter to the lamp. As shown, L represents a pyrophoric lighter of ordinary construction comprising the tube 50 having ears 51 between which is pivoted the spark wheel 52, the outer end of the tube receiving a cap 53 for adjusting the pressure of the spring 54 against the stick 55 of pyrophoric material. The tube structure has the cylindrical shell extension 56 which is threaded to fit in the threaded section 25 of the reflector structure. This shell is at such an angle with the tube that the tube will lie alongside the reflector with the wheel below the axis of the burner. With this arrangement the wheel will not be heated by the flame but turning thereof will direct the sparks toward the tip outlet. The tube 50 will serve also as a lever for threading the shell 56 into the reflector structure.

In Figs. 2, 3 and 6 the burner tip is mounted on the rear wall 25' of the reflector structure. In Fig. 7 a modified arrangement is shown, the pyrophoric tube supporting shell 56 being provided with an inner wall 57 in which the tip 29 is seated, and the inner wall 25' of the reflector structure has the opening 58 through which the inner end of the tip extends. In either arrangement the gas must flow through the long spiral passageway 31 before it can reach the tip, and in either arrangement the tip is within a pocket and shielded from drafts.

I thus provide a strong, light, safe and efficient lamp on which the water flow can be readily, quickly and accurately controlled, and which for any setting of the water valve will deliver a powerful, steady and uniform flame. The various parts can be quickly disconnected for inspection or cleaning and can be quickly and accurately replaced.

I do not of course desire to be limited to the exact constructions and arrangements shown and described as modifications can no doubt be made which will still come within the scope of the invention.

I claim as follows:

1. In an acetylene lamp, the combination of a water container, a carbid container, a water tube extending from the water container to the carbid container and having a valve seat, a valve stem in said tube having a valve surface for coöperating with said seat to control the flow of water, and pin and slot connection between said stem and tube for effecting longitudinal movement of said stem during rotation thereof to thereby adjust said valve.

2. In an acetylene lamp, the combination of a water container, a carbid container, a water tube connecting said containers and having a valve seat, a valve stem within said tube having a valve surface for engaging said seat, said tube having a diagonal slot, and a pin extending from said stem into said slot to coöperate therewith to longitudinally shift the stem to adjust the valve when the stem is turned.

3. In an acetylene lamp, the combination of a water container, a carbid container, a tube extending from said water container into the carbid container and having a valve seat, a stem reciprocable within said tube and having a valve surface for coöperating with said seat to control the flow of water to the carbid container, said tube having a slot extending downwardly from the upper edge thereof and having a diagonal section, and a pin on said stem for engaging in said slot, the pin and diagonal section of the slot coöperating to effect longitudinal movement of the stem and adjustment of the valve when the stem is turned.

4. In an acetylene lamp, the combination of a water container, a carbid container, a water tube extending from the water container and having an outlet to the carbid container, a valve within said tube for controlling the outlet, and pin and diagonal slot connection between said valve and tube for controlling the longitudinal adjustment of said valve when the valve is turned axially.

5. In an acetylene lamp, the combination of a water container, a carbid container, a water tube extending from the water container to the carbid container, said tube having a water inlet communicating with the water container and an outlet to the carbid container, a valve seat surrounding the tube outlet, a valve stem in said tube for coöperating with said valve seat to control the flow of water from said outlet, said tube having a diagonal slot section, and a pin extending from said stem into said slot section to coöperate therewith to effect raising or lowering of said stem with reference to said valve seat to thereby control the water flow from the outlet, said tube having also a vertical slot section extending from the top of the diagonal slot section to the top of the tube, said pin being adapted to pass through said vertical slot section to enable removal of said stem from the tube.

6. In an acetylene lamp, the combination of a water container, a carbid container, a water tube connecting said containers and having a valve seat, a valve stem within said tube having a valve surface for engaging said seat, said tube having a slot and said stem having a pin extending into said slot, said slot extending diagonally only part way around the tube and being of comparatively large pitch whereby a fractional turn of the stem will effect coöperation of the slot and pin to cause longitudinal shift of the stem to open the valve wide or to close it, said tube having a passageway to its upper end for said pin for enabling removal of said stem from the tube.

In witness whereof I have hereunto set my hand this 16th day of July, A. D. 1915.

AUGIE L. HANSEN.

Witnesses:
C. J. SCHMIDT,
LURLINE BULLWINKEL.